US006917406B2

(12) United States Patent
Yang

(10) Patent No.: US 6,917,406 B2
(45) Date of Patent: *Jul. 12, 2005

(54) ELECTRODE ARRAY STRUCTURE OF IPS-LCD

(75) Inventor: Kie-Hsiung Yang, Taoyuan Hsien (TW)

(73) Assignee: Hannstar Display Corp., Tiapei (TW)

( * ) Notice: Subject to any disclaimer, the term of this patent is extended or adjusted under 35 U.S.C. 154(b) by 737 days.

This patent is subject to a terminal disclaimer.

(21) Appl. No.: 09/881,264

(22) Filed: Jun. 14, 2001

(65) Prior Publication Data

US 2002/0131005 A1 Sep. 19, 2002

(30) Foreign Application Priority Data

Mar. 16, 2001 (TW) .................................... 90106221 A

(51) Int. Cl.⁷ ............................................ G02F 1/1343
(52) U.S. Cl. ...................... 349/139; 349/141; 349/143
(58) Field of Search ................................ 349/139, 141, 349/143

(56) References Cited

U.S. PATENT DOCUMENTS 6,449,027 B2 * 9/2002 Lee et al. .................... 349/141
6,630,979 B2 * 10/2003 Yang .......................... 349/141

FOREIGN PATENT DOCUMENTS

JP 07191336 7/1995 ........... G02F/1/134

OTHER PUBLICATIONS

EPO Communication—European Search Report Mailed Sep. 17, 2001.

* cited by examiner

Primary Examiner—Long Pham
Assistant Examiner—Wai-Sing Louie
(74) Attorney, Agent, or Firm—Thomas, Kayden, Horstemeyer & Risley

(57) ABSTRACT

An electrode array structure comprises a plurality of teeth of a comb-shaped common electrode extending in a first lengthwise direction, and a plurality of teeth of a comb-shaped pixel electrode extending in a second lengthwise direction, wherein each tooth of the pixel electrode parallel is disposed between adjacent teeth of the common electrode. When the tooth of the common electrode has a rectangular profile, the tooth of the pixel electrode has a continuous ∠-shaped profile which may be formed by lengthwise linking of trapezoids or inverted trapezoids. When the tooth of the pixel electrode has a rectangular profile, the tooth of the common electrode has a continuous ∠-shaped profile which may be formed by lengthwise linking of trapezoids or inverted trapezoids. When the tooth of the pixel electrode has a continuous ∠-shaped profile which may be formed by lengthwise linking of trapezoids, the tooth of the common electrode has a continuous ∠-shaped profile which may be formed by lengthwise linking of inverted trapezoids.

30 Claims, 14 Drawing Sheets

ELECTRODE ARRAY STRUCTURE OF IPS-LCD

BACKGROUND OF THE INVENTION

1. Field of the Invention

The present invention relates to an In-Plane Switching mode LCD (IPS-LCD) and, more particularly, to an electrode array structure of an IPS-LCD and a method of forming the same.

2. Description of the Related Art

Liquid crystal displays (LCDs) may be classified by the orientation of the liquid crystal molecules between the spaced apart substrates. In a conventional twisted nematic LCD (TN-LCD), the liquid crystal molecules are twisted between the two substrates. In contrast, in an in-plane switching mode LCD (IPS-LCD), common electrodes and pixel electrodes are formed on a lower glass substrate (TFT substrate) and an in-plane electric field therebetween is generated to rearrange the liquid crystal molecules along the in-plane electric field. Accordingly, the IPS-LCD has been used or suggested for improving viewing angle, contrast ratio and color shift.

In the IPS-LCD, the display characteristics of the view angle with respect to the invert luminance are superior. However, as shown in FIG. 1, when the liquid crystal molecules 1 are rotated to an angle 45° with respect to the in-plane electric field, the observed image from the direction crossing at 45 degrees or 135 degrees against the lengthwise direction of the common electrodes 2 and the pixel electrodes 3 is colored blue or yellow. This is a problem to be solved in the image quality of the IPS-LCD.

Seeking to solve the coloring phenomenon, a herringbone-shaped electrode structure is developed for modifying the rotating angle of the liquid crystal molecules. As shown in FIG. 2, in the conventional IPS-LCD, a TFT substrate 10 has a plurality of parallel data lines 12 extending along Y-axis and a plurality of parallel gate lines 14 extending along X-axis, which are arranged in a manner to form a matrix of pixel areas 24. Also, a comb-shaped pixel electrode 18 and a herringbone-shaped common electrode 20 are disposed in each pixel area 24, and at least one TFT device 16 is disposed at a cross point of the data line 12 and the gate line 14. In addition, an orientation layer (not shown) is spread on the entire surface of the TFT substrate 10, and the orientation layer is rubbed in a direction shown by arrow A so as to make liquid crystal molecules 22 arrange along the direction A before an external voltage is applied to the TFT substrate 10.

The comb-shaped pixel electrode 18 has a bar 18a transversely disposed over the gate line 14 to form a capacitor, and a plurality of continuous saw-toothed teeth 18b, 18c extending along Y-axis from the bar 18a. The herringbone-shaped common electrode 20 has a center wiring portion 20a extending along X-axis, and a plurality of saw-toothed bones 20b, 20c bent at the center wiring portion 20a and respectively extending along a first Y-axis and a second Y-axis. For example, the bones 20b extending along the first Y-axis are parallel to the teeth 18b, 18c and the bones 20b arrange at intervals between the teeth 18b, 18c.

When external voltage is applied to the TFT substrate 10, an in-plane electric field is formed between the bones 20a, 20b and the teeth 18b, 18c, resulting in a rotation of the liquid crystal molecules 22 toward the in-plane electric field. Using the center wiring portion 20a of the common electrode 20 as the discrimination, the pixel area 24 is divided into a first sub-pixel area 241 and a second sub-pixel area 242, and the liquid crystal molecules 22a and 22b positioned adjacent to the center wiring portion 20a respectively rotate in counterclockwise direction and in clockwise direction. In the first sub-pixel area 241, since the bones 20b, 20c and the teeth 18b, 18c have the same saw-toothed sidewalls, the liquid crystal molecules 22a and 22a' positioned adjacent to the tip of the saw-toothed sidewall respectively rotate in counterclockwise direction and in clockwise direction. Therefore, two domains are formed within the first sub-pixel area 241. Similarly, the liquid crystal molecules 22b and 22b' also form two domains within the second sub-pixel area 242. Furthermore, the saw-toothed sidewalls lead to a specific tilted degree of the in-plane electric field which corresponds to the rotation angle of the major axes of the liquid crystal molecules 22. It is preferable that the rotation angle θ of the liquid crystal molecules 22 satisfy the formula $0°<\theta\leq+60°$ or $-60°\leq\theta<0°$ to solve the coloring phenomenon.

However, the liquid crystal molecules 22 positioned at the peaks of the saw-toothed sidewall, that is, the parting of the two domains of the sub-pixel area, are jostled by surrounding molecules 22 that rotate in a different direction, thus the liquid crystal molecules 22 on the parting of the two domains are stopped from rotating. Due to both the stopped rotation and the common electrode 20 and the pixel electrode 20 non-transparent nature, the liquid crystal molecules 22 positioned at the peaks of the saw-toothed sidewall present as dark lines after voltage is applied to the TFT substrate 10, as shown by dotted lies I—I and II—II. This decreases the aperture ratio of the IPS-LCD. Especially when the number of peaks of the saw-toothed sidewall is increased, the number of dark lines is correspondingly increased and thereby the aperture ratio is further decreased. Thus, a novel electrode array structure of the IPS-LCD eliminating the aforementioned problems is called for.

SUMMARY OF THE INVENTION

The present invention provides an electrode array structure and a method of forming the same to modify the rotation angle of the liquid crystal molecules, thus eliminating the coloring phenomenon and increasing the aperture ratio of the IPS-LCD.

In a pixel area of an IPS-LCD, the electrode array structure comprises a plurality of teeth in a comb-shaped common electrode extending in a first lengthwise direction, and a plurality of teeth in a comb-shaped pixel electrode extending in a second lengthwise direction, wherein each tooth of the pixel electrode parallel is disposed between adjacent teeth of the common electrode. When the tooth of the common electrode has a rectangular profile, the tooth of the pixel electrode has a continuous ∠-shaped profile which may be formed by lengthwise linking of trapezoids or inverted trapezoids. When the tooth of the pixel electrode has a rectangular profile, the tooth of the common electrode has a continuous ∠-shaped profile which may be formed by lengthwise linking of trapezoids or inverted trapezoids. When the tooth of the pixel electrode has a continuous ∠-shaped profile which may be formed by lengthwise linking of trapezoids, the tooth of the common electrode has a continuous ∠-shaped profile which may be formed by lengthwise linking of inverted trapezoids.

Accordingly, it is a principle object of the invention to provide the ∠-shaped sidewall of the electrode to modify the rotation angle of liquid crystal molecules.

It is another object of the invention to make the rotation angle θ of the liquid crystal molecules satisfy the formula $0°<\theta \leq +60°$ or $-60° \leq \theta <0°$.

Yet another object of the invention is to solve the coloring phenomenon.

It is a further object of the invention to increase the aperture ratio of the IPS-LCD.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

[First Embodiment]

Figure 1:
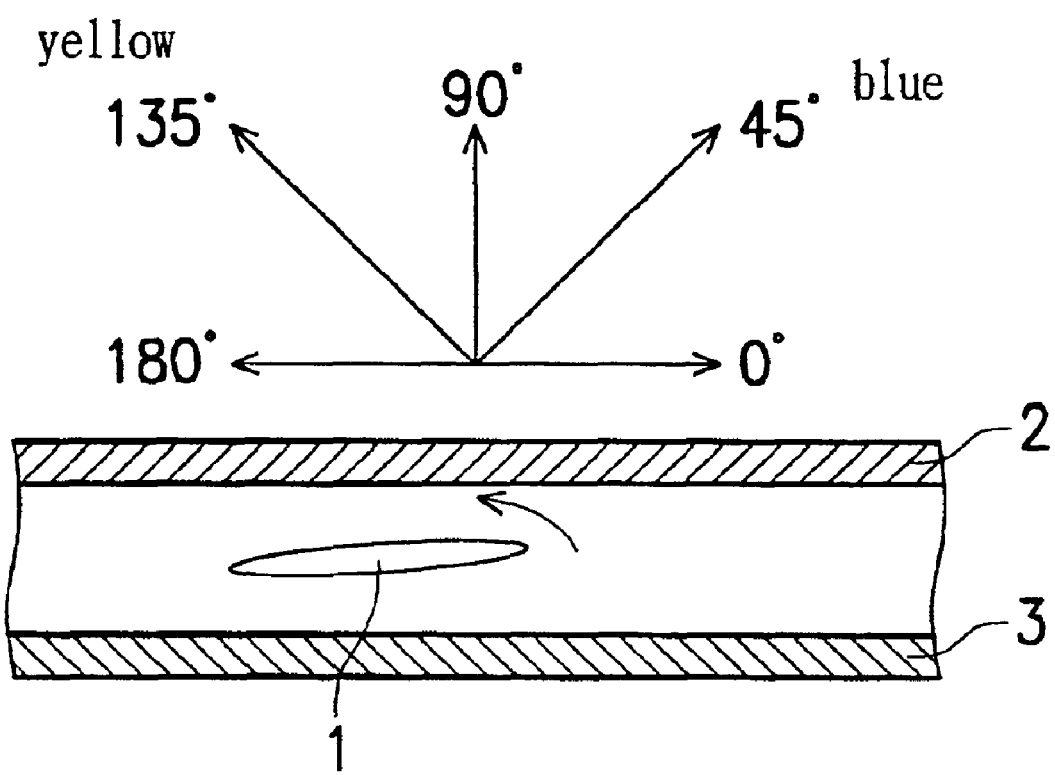
FIG. 1 is a top view showing the coloring image corresponding to the view angle.
Figure 2:
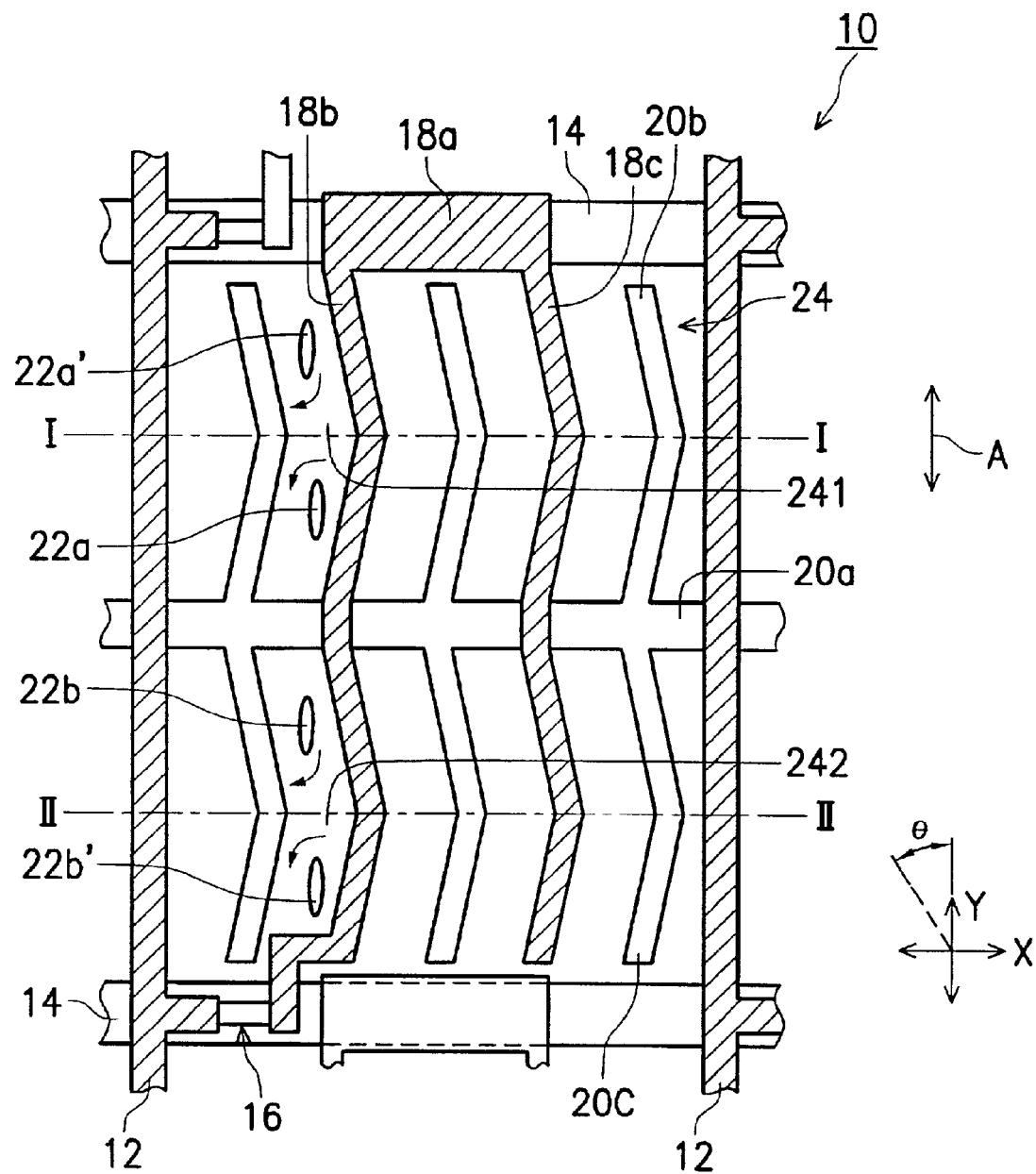
FIG. 2 is a top view showing the electrode array structure of a conventional IPS-LCD.
Figure 3A:
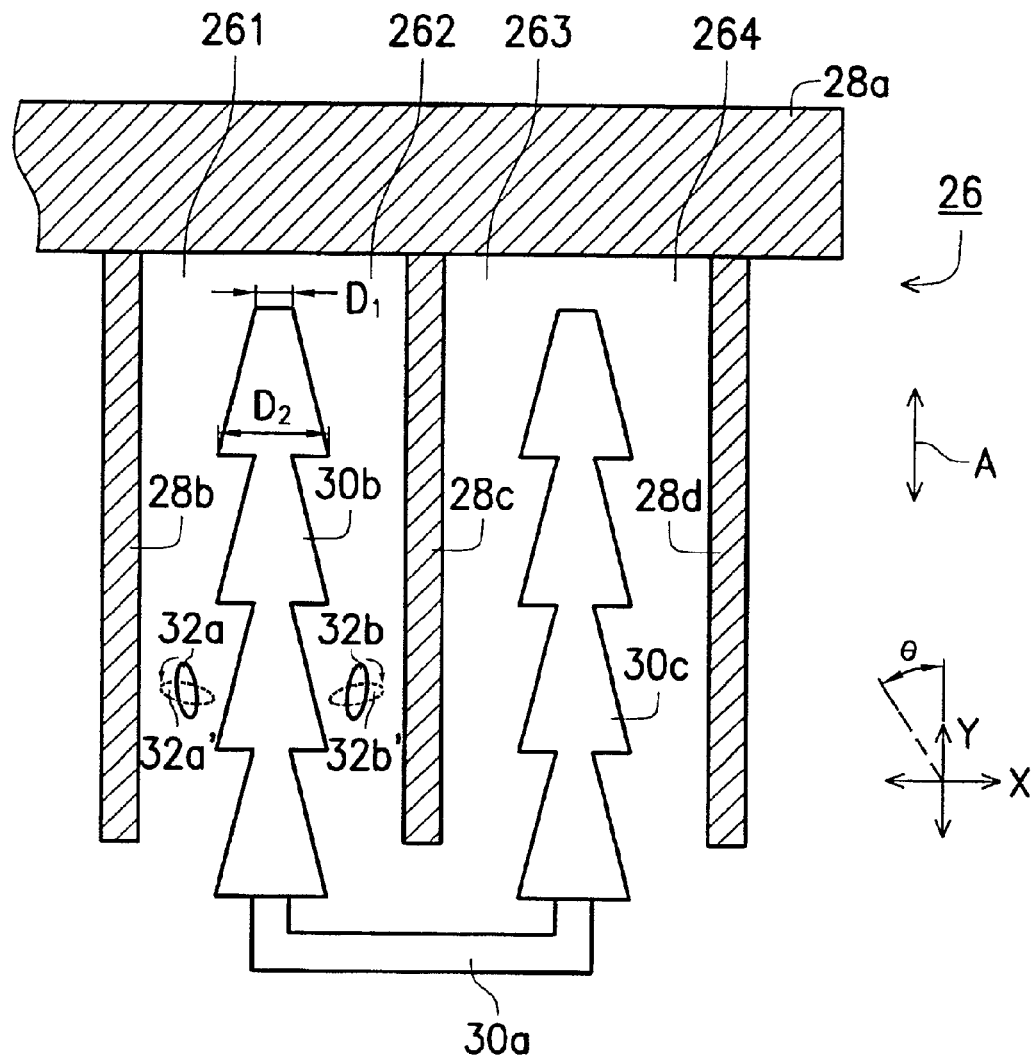
FIGS. 3A and 3B are top views showing the electrode array structure of IPS-LCD according to the first embodiment of the present invention.
Figure 3B:
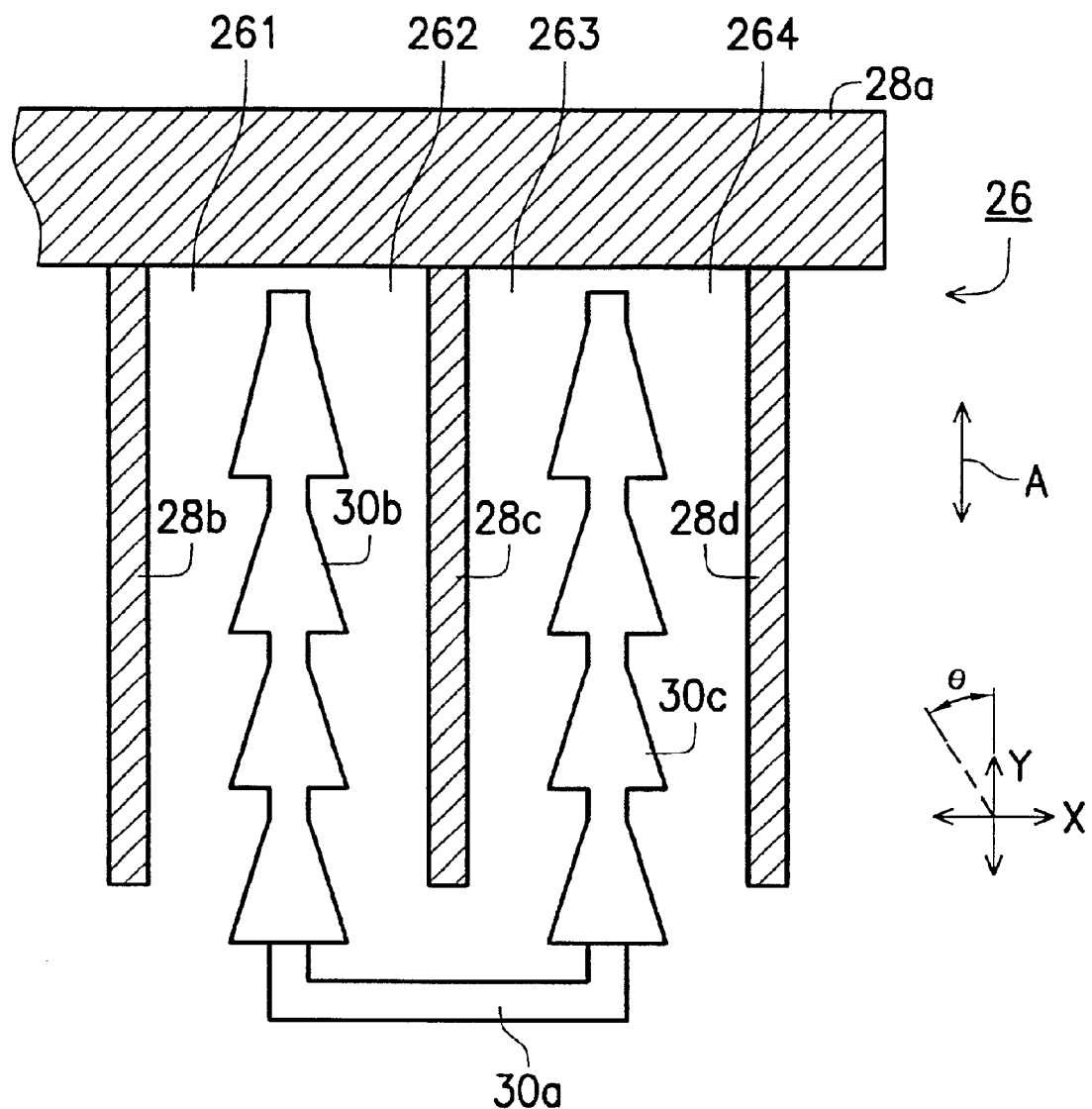

FIGS. 3A and 3B are top views showing the electrode array structure of an IPS-LCD according to the first embodiment of the present invention. In a pixel area 26, a comb-shaped common electrode 28 has a bar 28a and three teeth 28b, 28c, 28d, and a comb-shaped pixel electrode 30 has a bar 30a and two teeth 30b, 30c. Since the two teeth 30b, 30c are arranged at intervals among the three teeth 28b, 28c, 28d, the pixel area 26 is divided into four sub-pixel areas 261, 262, 263, 264. As shown in FIG. 3A, note that each tooth 30b, 30c of the pixel electrode 30 is formed by lengthwise linking of a plurality of specific trapezoids to present a continuous ∠-shaped sidewall, presenting a Christmas tree-like-like profile. The top-base length $D_1$ and the bottom-base length $D_2$ Of the specific trapezoid satisfy the formula $D_2 \leq |D_1 \pm 50 \, \mu m|$, excluding the case that $D_2=D_1$.

Before a voltage is applied to the IPS-LCD, liquid crystal molecules 32 align along a rubbed direction shown by arrow A, thus the major axes of the liquid crystal molecules 22 parallel the teeth 28b, 28c, 28d of the common electrode 28. After applying the voltage to the IPS-LCD, an in-plane electric field is formed between the teeth 28b, 28c, 28d of the common electrode 28 and the teeth 30b, 30c of the pixel electrode 30, and then the liquid crystal molecules 32 rotate toward the in-plane electric field. For example, the liquid crystal molecule 32a positioned within the first sub-pixel area 261 rotates counterclockwise to become the dotted molecule 32a'. The liquid crystal molecule 32b positioned within the second sub-pixel area 262 rotate clockwise to become the dotted molecule 32b'. Thus, the tooth 30b of the pixel electrode 30 serves as a parting of two domains. Similarly, within the third sub-pixel area 263 and the fourth sub-pixel area 264, the tooth 30c of the pixel electrode 30 serves as a parting of two domains. Because the continuous ∠-shaped sidewalls lead to a specific tilted degree of the in-plane electric field which corresponds to the rotation angle of the major axes of the liquid crystal molecules 32, it is preferable that the rotation angle θ of the liquid crystal molecules 32 satisfy the formula $0°<\theta \leq +60°$ or $-60° \leq \theta <0°$ to solve the coloring phenomenon.

In addition, the liquid crystal molecules 32 positioned over the tooth 30b, 30c of the pixel electrode 30, that is the parting of the two domains, are jostled by surrounding molecules 32 that rotate in a different direction, thus the liquid crystal molecules 32 over the tooth 30b, 30c are stopped from rotating, presenting as a dark line. However, since the pixel electrode 30 is not of transparent materials, the dark lines presenting on the teeth 30b, 30c of the pixel electrode 30 do not further decrease the aperture ratio of the IPS-LCD. Moreover, if the pixel electrode 30 is made of transparent materials, the aperture ratio of the IPS-LCD can be increased.

According to the above-described electrode array structure, the profile of the teeth 30b, 30c of the pixel electrode 30 can be further modified as shown in FIG. 3B. Note that a rectangular strip is disposed between two adjacent trapezoids.

Hereinafter, the electrode array structure shown in FIG. 3A and modified designs of thereof are applied to a TFT substrate of IPS-LCD, as shown in FIGS. 4A to 4D.

Figure 4A:
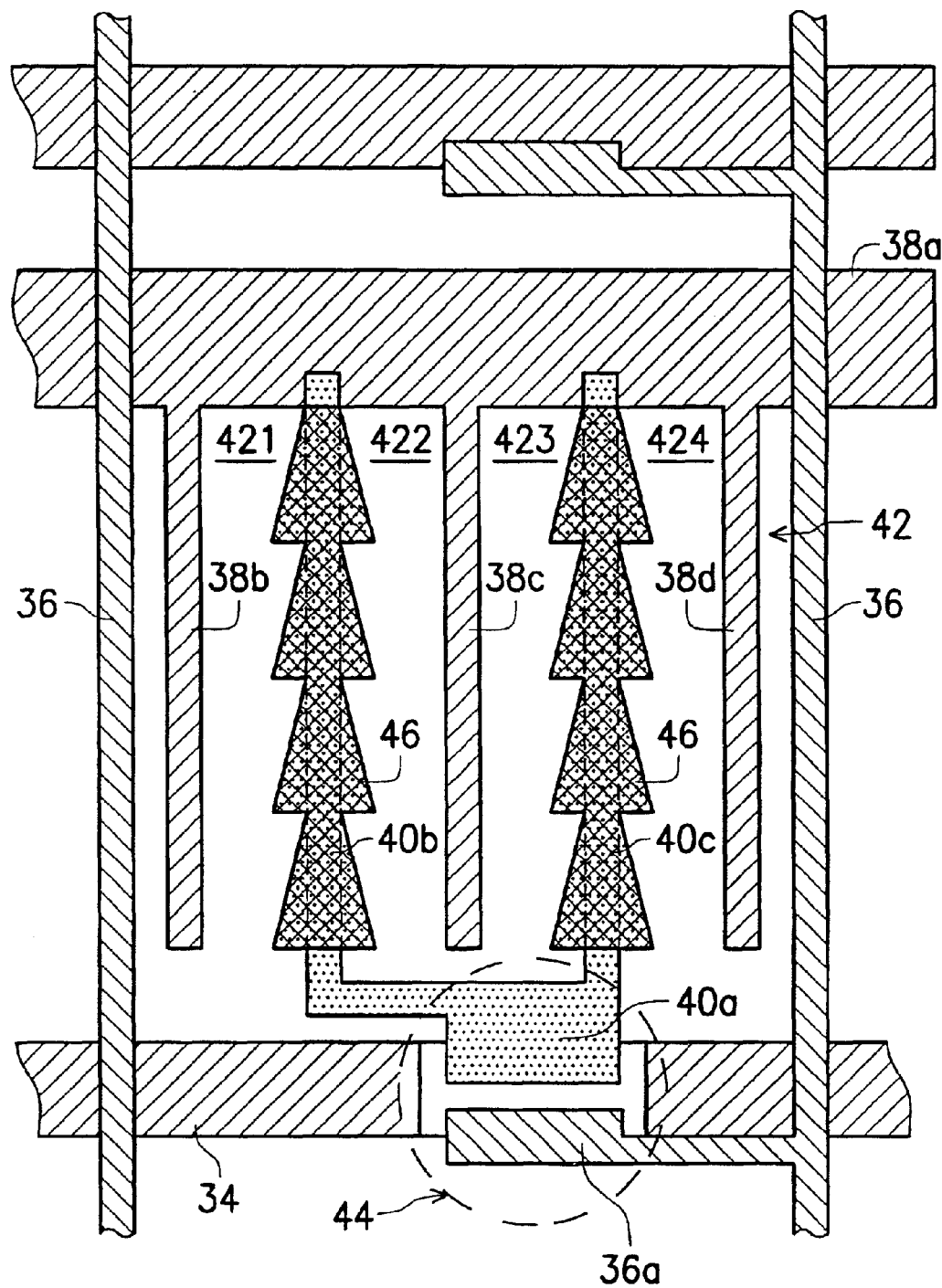
FIG. 4A is a top view of a TFT substrate showing the first modified design of the electrode array structure shown in FIG. 3A.

FIG. 4A is a top view of a TFT substrate showing the first modified design of the electrode array structure shown in FIG. 3A. In the first embodiment of the present invention, a TFT substrate has a plurality of parallel data lines 36 extending lengthwise and a plurality of parallel gate lines 34 extending transversely, which are arranged in a manner to form a matrix of pixel areas 42. Also, a comb-shaped common electrode 38 and a comb-shaped first pixel electrode 40 are disposed in each pixel area 42. The comb-shaped common electrode 38 has a bar 38a and three rectangular-shaped teeth 38b, 38c, 38d, and the comb-shaped first pixel electrode 40 has a bar 40a and two rectangular-shaped teeth 40b, 40c. Since the two teeth 40b, 40c appear at intervals among the three teeth 38b, 38c, 38d, the pixel area 42 is divided into four sub-pixel areas 421, 422, 423, 424. Moreover, a TFT device 44 is disposed on a predetermined area of the gate line 34, wherein a drain electrode is electrically connected to the bar 40a of the first pixel electrode 40, a source electrode is electrically connected to an extending area 36a of the data line 36, and a channel is disposed between the drain electrode and the source electrode.

In addition, a second pixel electrode 46 is formed over each rectangular-shaped tooth 40b, 40c of the first pixel electrode 40, in which a protection layer (not shown) is sandwiched between the first pixel electrode 40 and the second pixel electrode 46. The second pixel electrode 46, of indium tin oxide (ITO) or any other transparent conductive material, is formed by lengthwise linking of a plurality of specific trapezoids, presenting as a continuous ∠-shaped sidewall. The top-base length $D_1$ and the bottom-base length $D_2$ of the specific trapezoid satisfy the formula $D_2 \leqslant |D_1 \pm 50 \mu m|$, excluding the case that $D_2=D_1$. Because the continuous ∠-shaped sidewalls lead to a specific tilted degree of the in-plane electric field which corresponds to the rotation angle of the major axes of the liquid crystal molecules, the rotation angle of the liquid crystal molecules is perfectly controlled to solve the coloring phenomenon. Also, since the first pixel electrode 40 is not of transparent materials, the dark lines presenting on the teeth 40b, 40c of the first pixel electrode 40 do not further decrease the aperture ratio of the IPS-LCD. Moreover, the second pixel electrode 46 is of transparent materials, so the aperture ratio of the IPS-LCD can be increased.

Figure 4B:
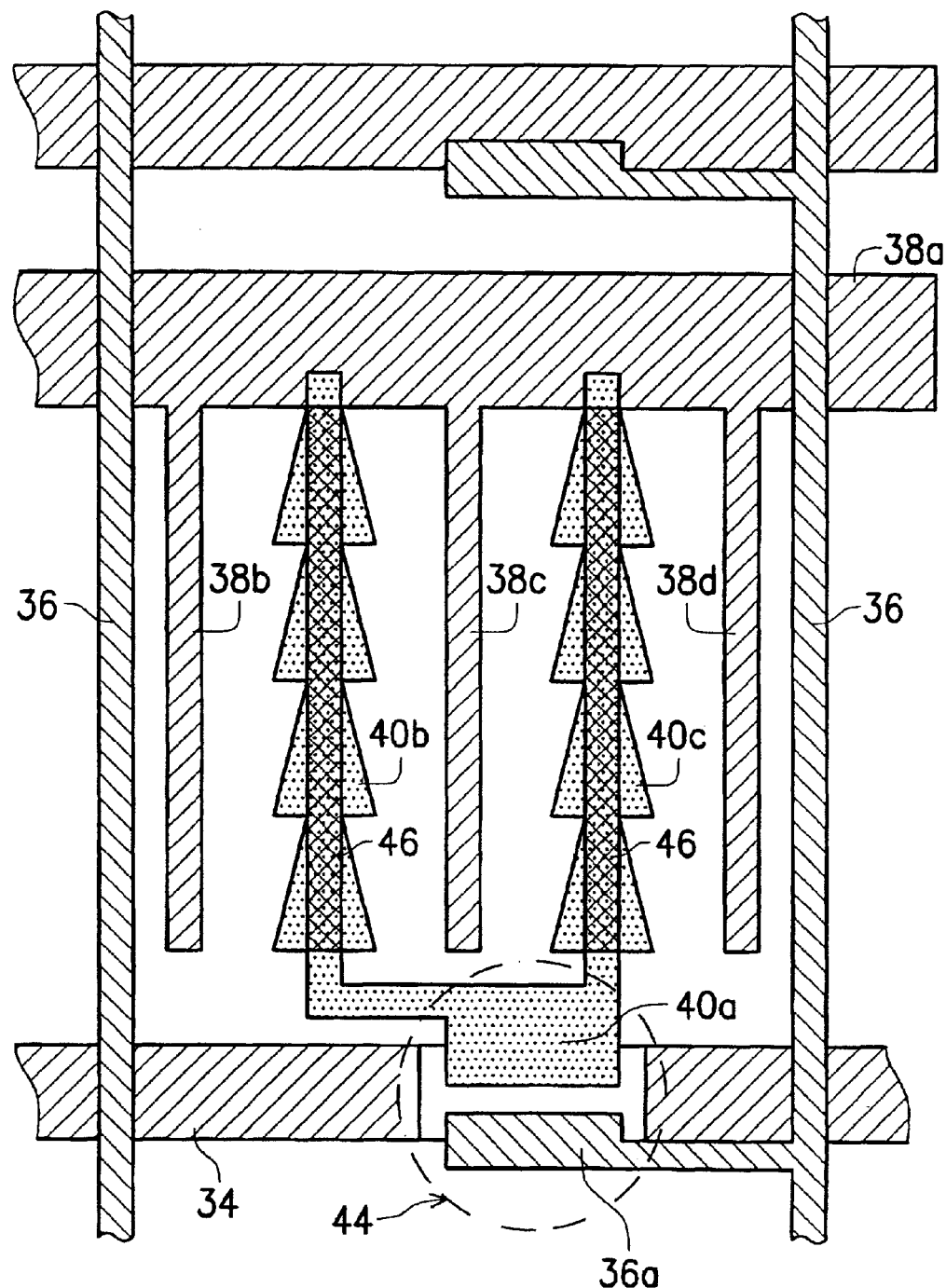
FIG. 4B is a top view of a TFT substrate showing the second modified design of the electrode array structure shown in FIG. 3A.

FIG. 4B is a top view of a TFT substrate showing the second modified design of the electrode array structure shown in FIG. 3A. Compared with the electrode array structure shown in FIG. 4A, in the second modified design shown in FIG. 4B, the pattern of the tooth 40b, 40c of the first pixel electrode 40 and the pattern of the second electrode 46 are exchanged. Thus, the tooth 40b, 40c of the first pixel electrode 40 is formed by lengthwise linking of the specific trapezoids to create a continuous ∠-shaped sidewall, and the second electrode 46 is formed to be a rectangular strip. This also achieves the aims of eliminating the coloring phenomenon and increasing the aperture ratio.

Figure 4C:
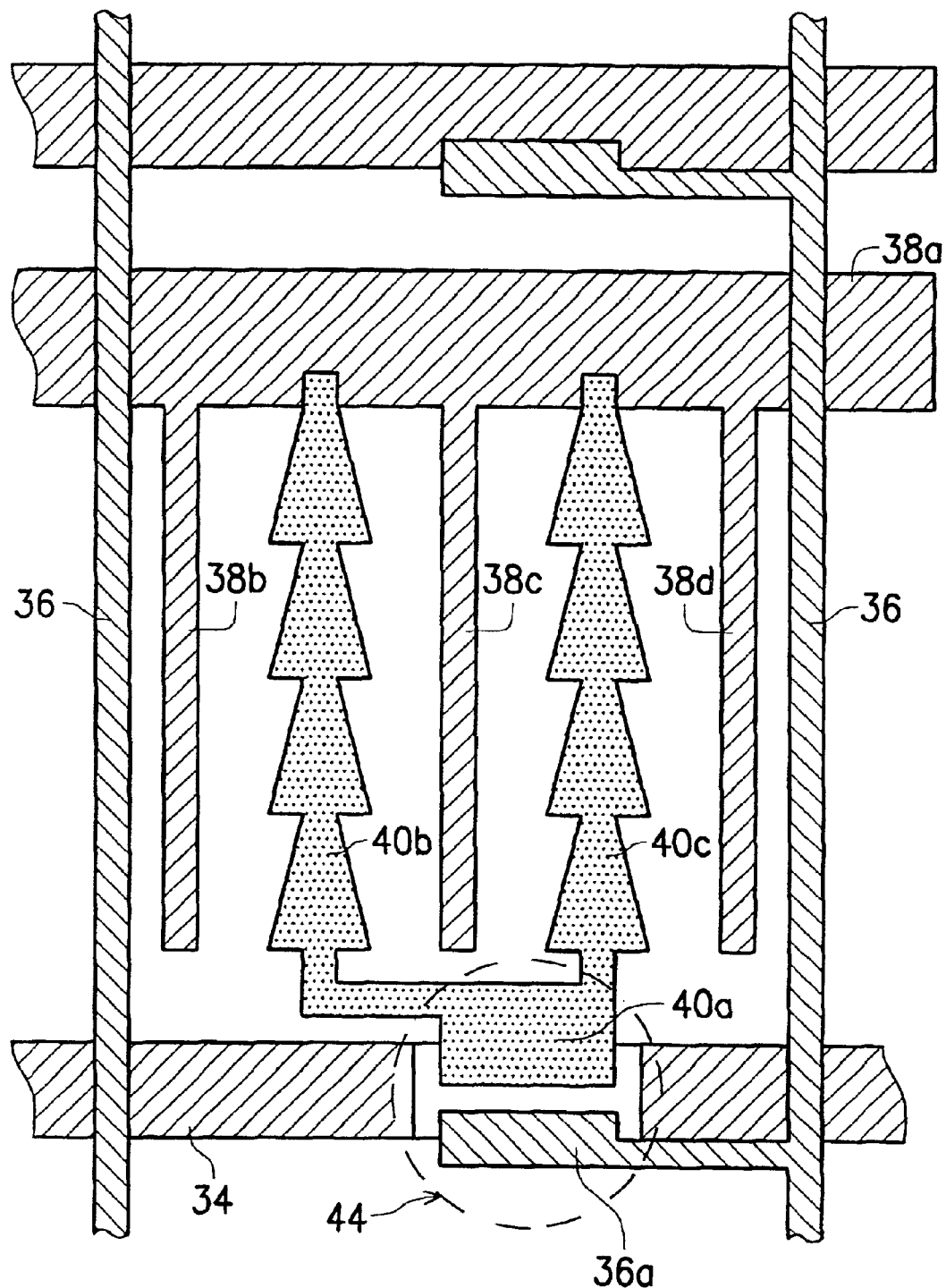
FIG. 4C is a top view of a TFT substrate showing the third modified design of the electrode array structure shown in FIG. 3A.

FIG. 4C is a top view of a TFT substrate showing the third modified design of the electrode array structure shown in FIG. 3A. Compared with the electrode array structure shown in FIG. 4B, in the third modified design shown in FIG. 4C, the fabrication of the second electrode 46 is omitted. Thus, only the tooth 40b, 40c of the first pixel electrode 40 is formed to present the continuous ∠-shaped sidewall. This not only achieves the aim of eliminating the coloring phenomenon, but also decreases manufacturing complexity and production costs.

Figure 4D:
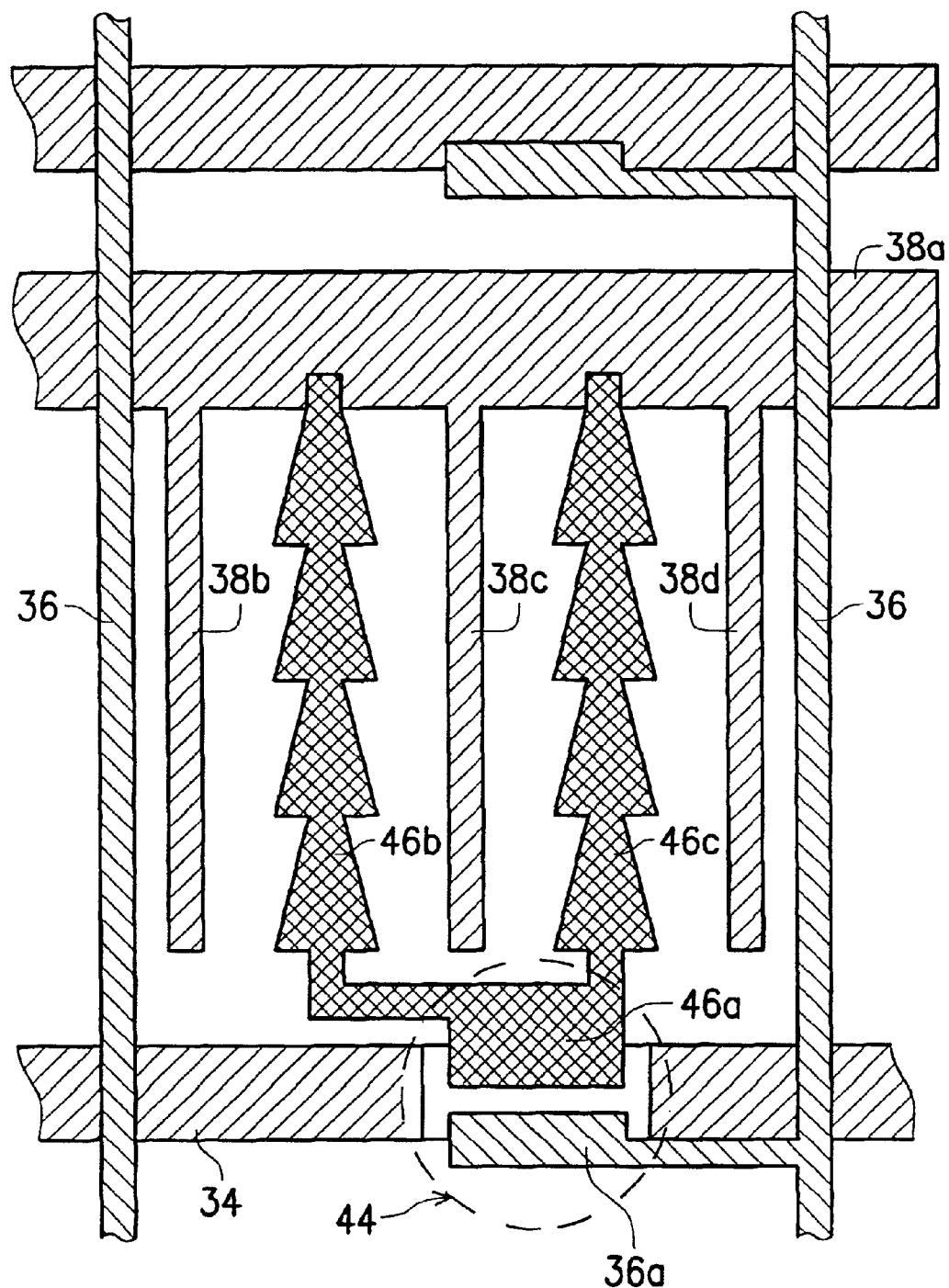
FIG. 4D is a top view of a TFT substrate showing the fourth modified design of the electrode array structure shown in FIG. 3A.

FIG. 4D is a top view of a TFT substrate showing the fourth modified design of the electrode array structure shown in FIG. 3A. Although the electrode array structure shown in FIG. 4C can further decrease manufacturing complexity and production costs, the first pixel electrode 40 of opaque materials occupies more areas when the tooth 40b, 40c forms the Christmas tree-like-like profile, thus the problem of decreasing the aperture ratio is encountered. Seeking to solve this problem, in the fourth modified design shown in FIG. 4D, the fabrication of the first pixel electrode 40 is omitted, and the pattern of the second pixel 46 is formed the same as the pattern of the first pixel electrode 40 shown in FIG. 4C. Therefore, the second electrode 46 has a bar 46a, two teeth 46b, 46c with continuous ∠-shaped sidewalls. This not only achieves the aims of eliminating the coloring phenomenon and decreasing manufacturing complexity and production costs, but also further increases the aperture ratio of the IPS-LCD.

[Second Embodiment]

Figure 5A:
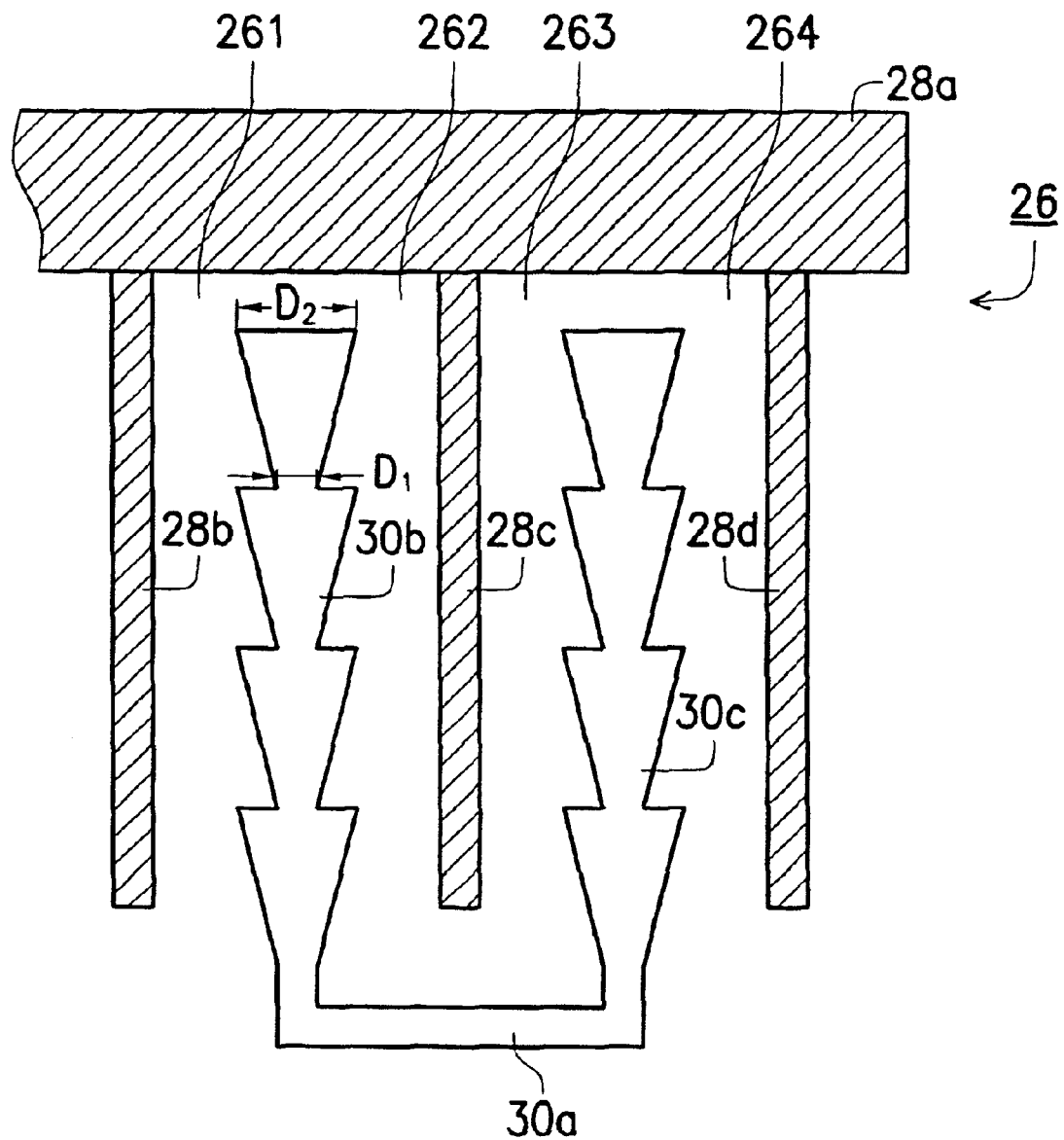
FIGS. 5A and 5B are top views showing the electrode array structure of IPS-LCD according to the second embodiment of the present invention.
Figure 5B:
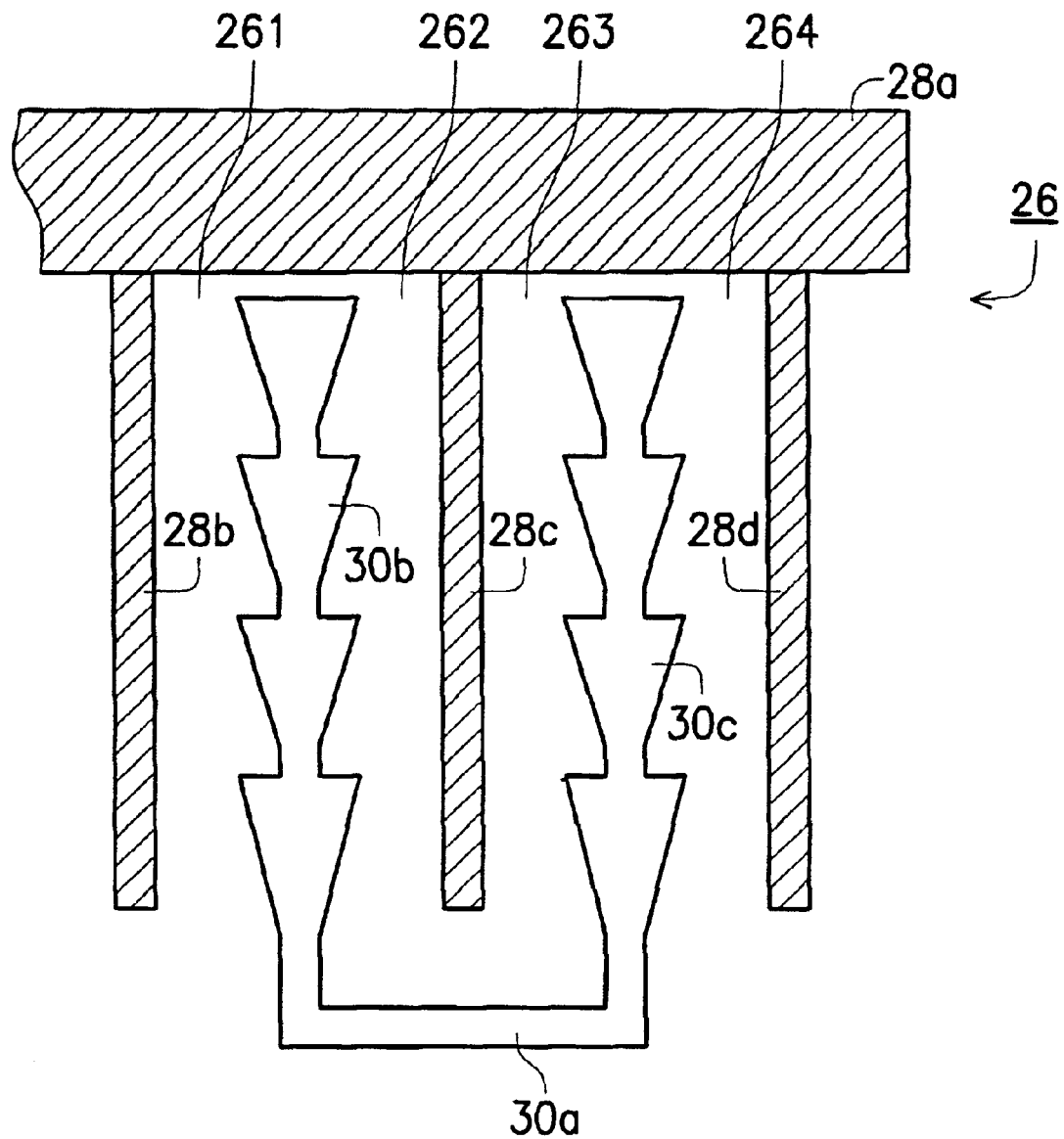

FIGS. 5A and 5B are top views showing the electrode array structure of IPS-LCD according to the second embodiment of the present invention. In the pixel area 26, the electrode array structure shown in FIG. 5A is almost the same as the electrode array structure shown in FIG. 3A except with respect to the tooth 30b, 30c of the pixel electrode 30. In the second embodiment, as shown in FIG. 5A, note that each tooth 30b, 30c of the pixel electrode 30 is formed by lengthwise linking of a plurality of inverted trapezoids, presenting an inverted Christmas tree-like-like profile. The length $D_1$ and the length $D_2$ of the inverted trapezoid satisfy the formula $D_2 \leqslant |D_1 \pm 50 \mu m|$, excluding the case that $D_2=D_1$. This achieves the aims of eliminating the coloring phenomenon and increasing the aperture ratio. Also, as shown in FIG. 5B, the profile of the tooth 30b, 30c of the pixel electrode 30 can be modified, in which a rectangular strip is disposed between two adjacent inverted trapezoids. Furthermore, according to the four modified designs shown in FIGS. 4A to 4D, the tooth 30b, 30c of the pixel electrode 30 can be formed by appropriately arranging the first electrode layer and the second electrode layer.

[Third Embodiment]

Figure 6A:
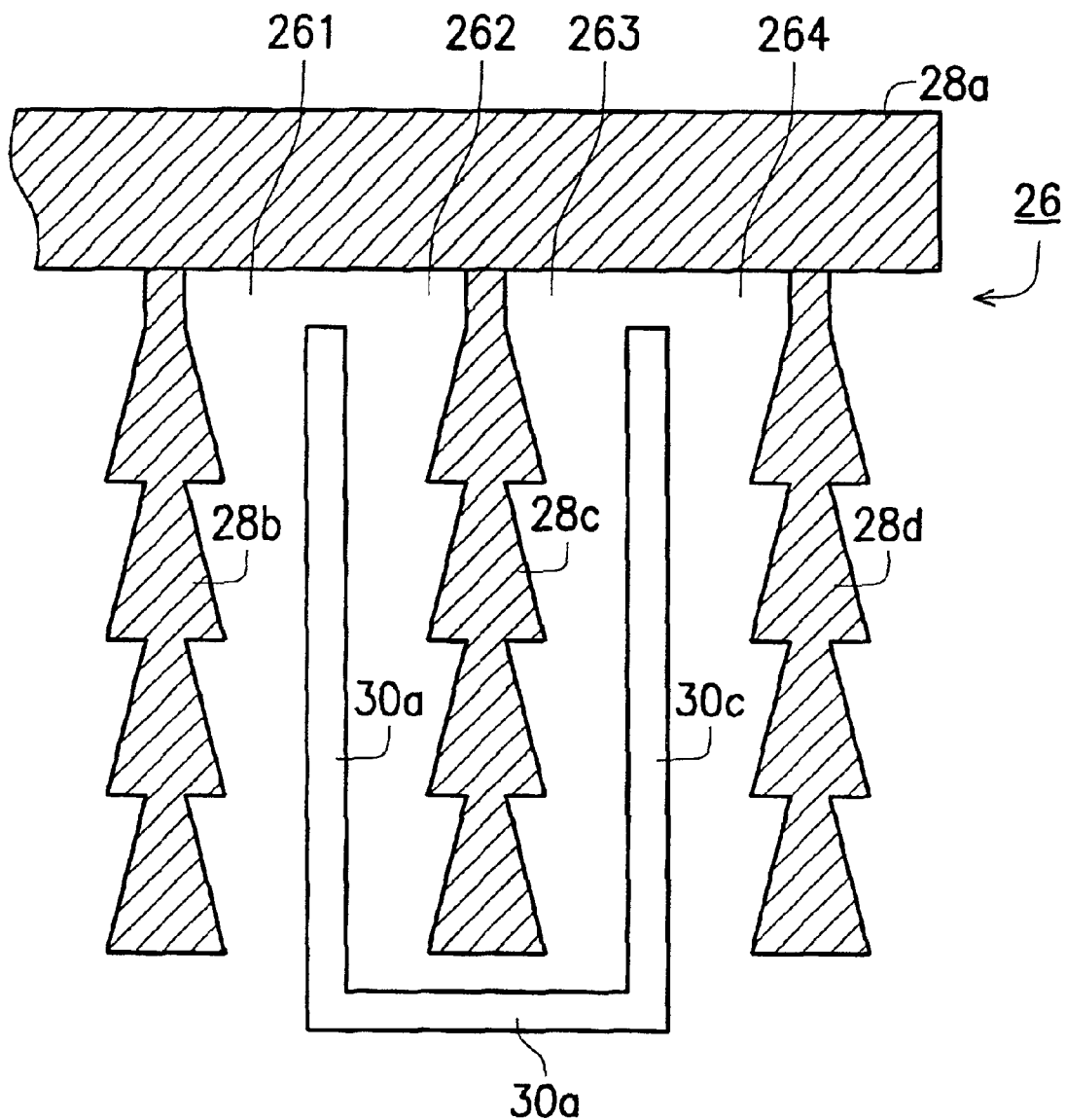
FIGS. 6A and 6B are top views showing the electrode array structure of IPS-LCD according to the third embodiment of the present invention.
Figure 6B:
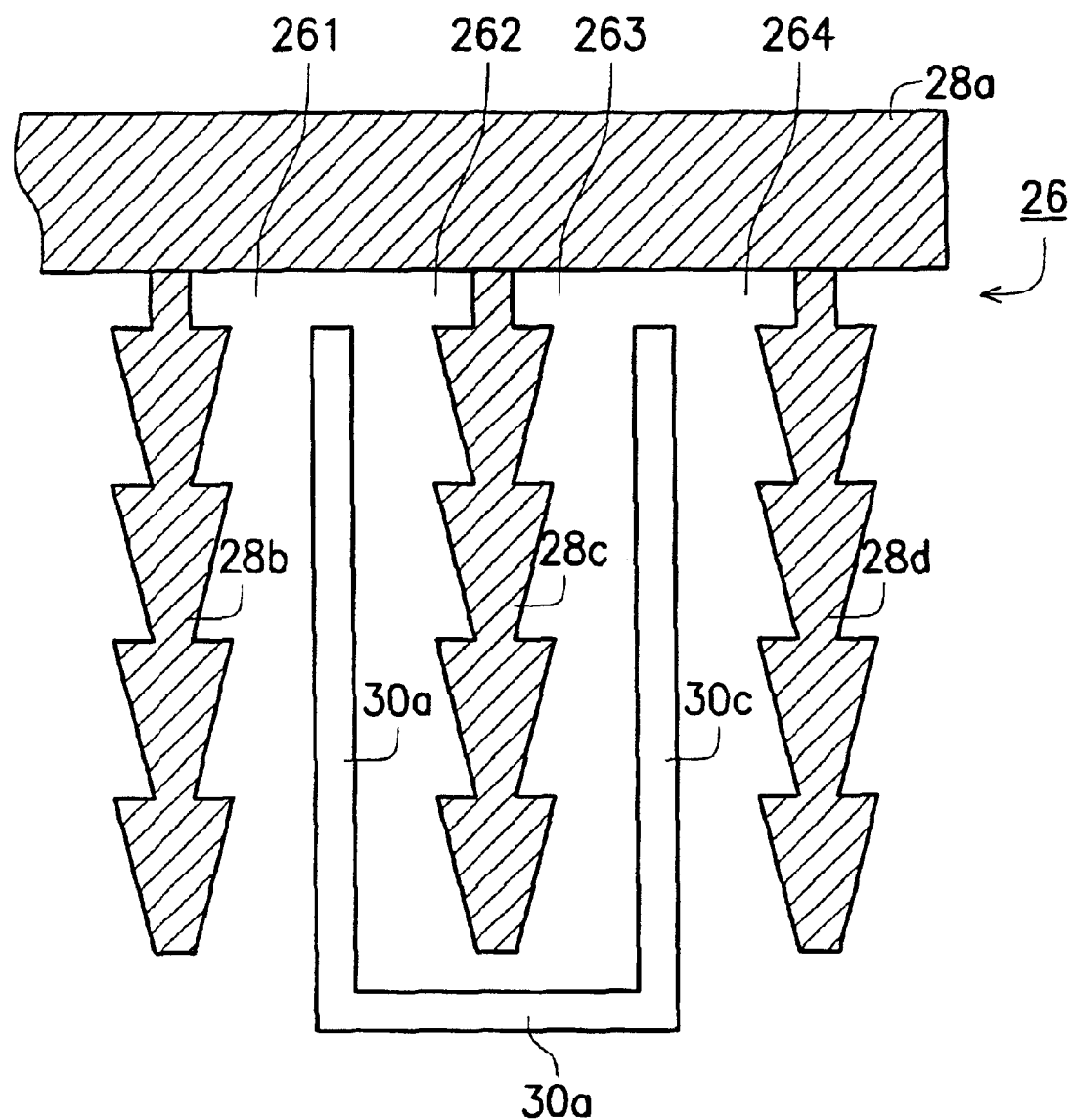

FIGS. 6A and 6B are top views showing the electrode array structure of an IPS-LCD according to the third embodiment of the present invention. Compared with the electrode array structure of the first embodiment shown in FIG. 3A, in the pixel area 26 of the third embodiment, the pattern of the tooth 28b, 28c, 28d of the common electrode 28 and the pattern of the tooth 30b, 30c of the pixel electrode 30 are exchanged. Thus, the tooth 28b, 28c, 28d of the common electrode 28 is formed by lengthwise linking of specific trapezoids to present a continuous ∠-shaped sidewall, and the tooth 30b, 30c of the electrode 30 is formed as a rectangular strip. This achieves the aims of eliminating the coloring phenomenon and increasing the aperture ratio. Also, the profile of the tooth 28b, 28c, 28d of the common electrode 28 can be modified, in which a rectangular strip is disposed between two adjacent trapezoids. Moreover, as shown in FIG. 6B, the profile of the tooth 28b, 28c, 28d of the common electrode 28 can be modified to present an inverted Christmas tree-like-like profile, wherein inverted trapezoids are lengthwise linked to form the tooth 28b, 28c, 28d. Furthermore, according to the four modified designs shown in FIGS. 4A to 4D, the tooth 28b, 28c, 28d of the common electrode 28 can be formed by appropriately arranging the first electrode layer and the second electrode layer.

[Fourth Embodiment]

Figure 7A:
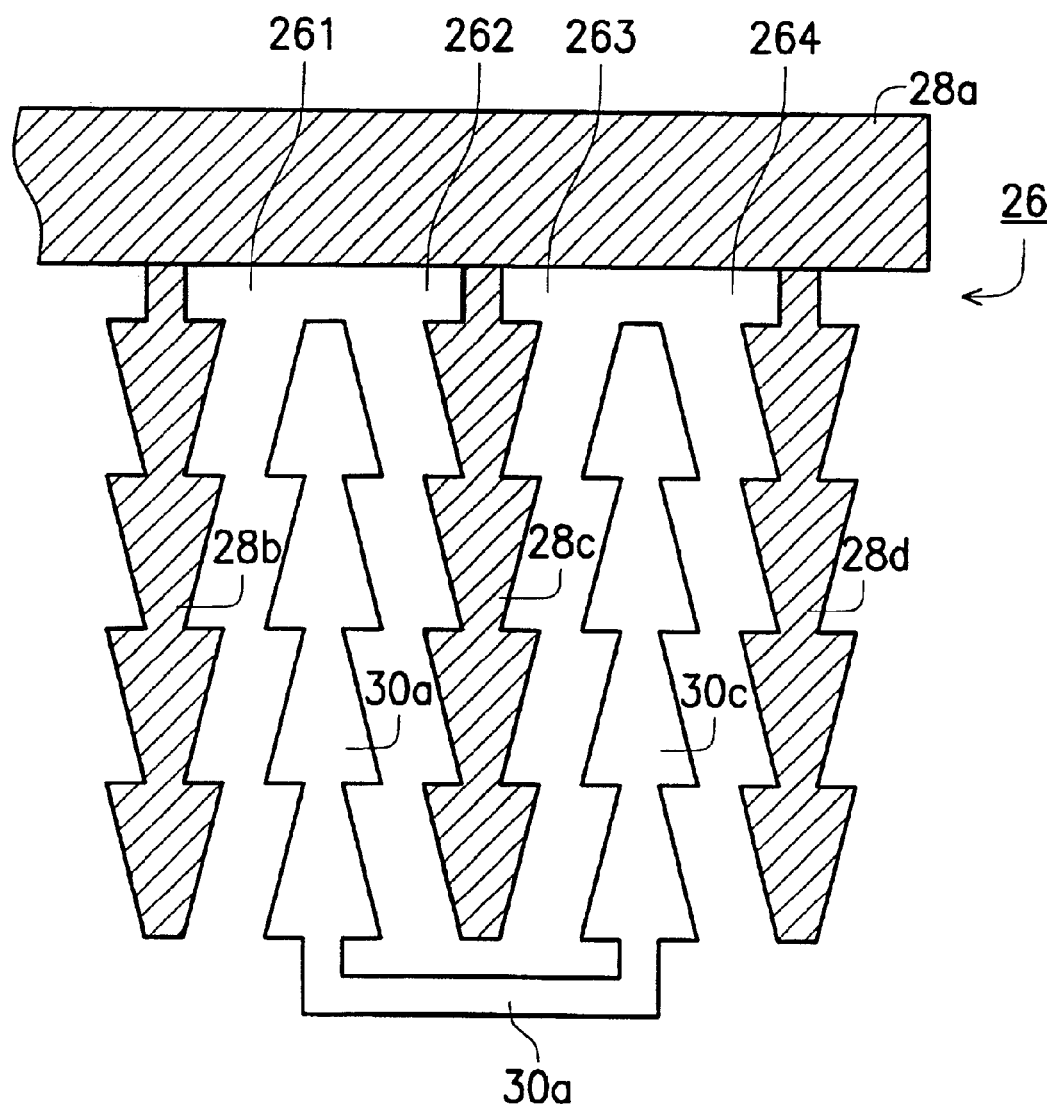
FIGS. 7A and 7B are top views showing the electrode array structure of IPS-LCD according to the fourth embodiment of the present invention.
Figure 7B:
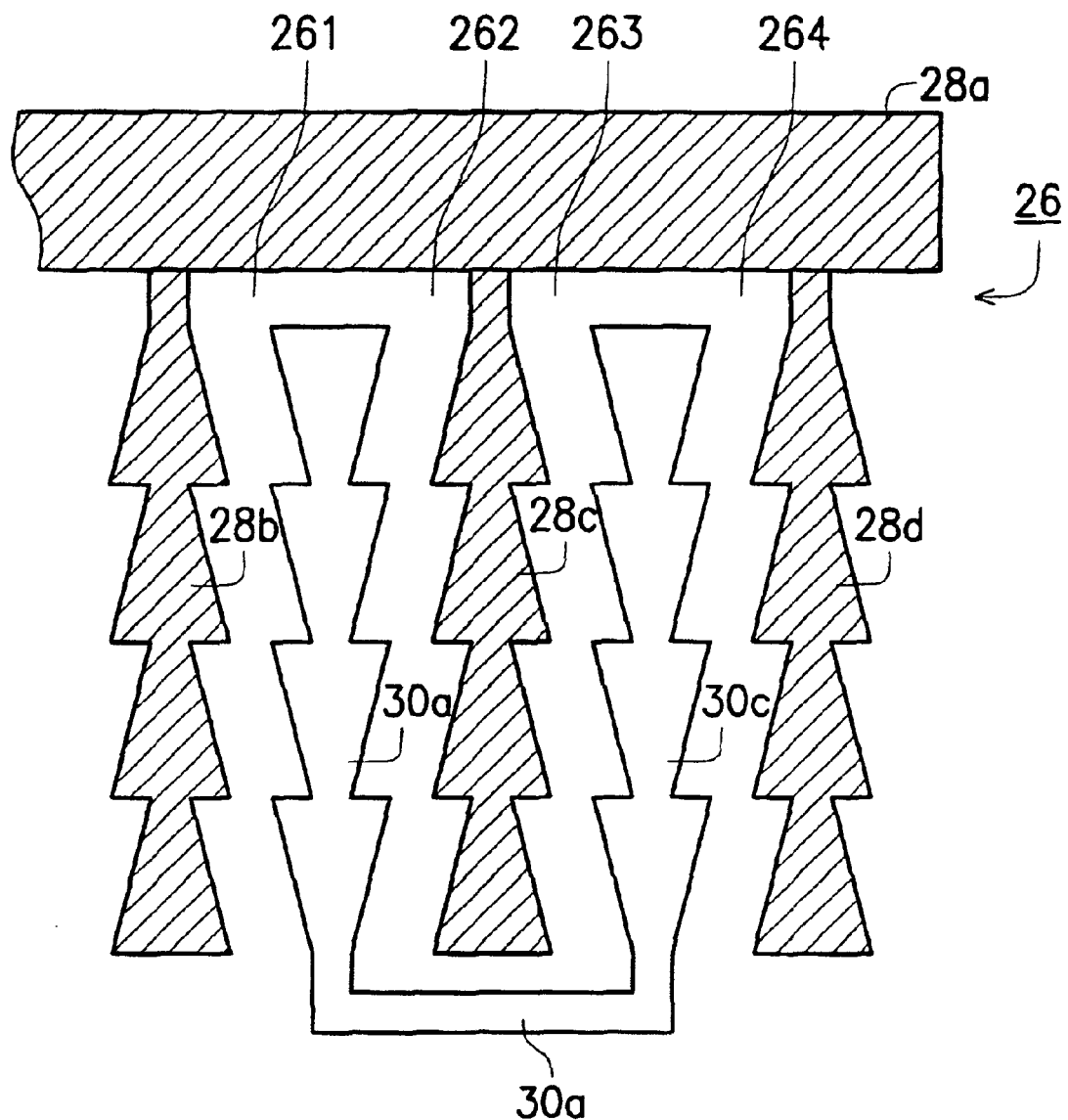

FIGS. 7A and 7B are top views showing the electrode array structure of IPS-LCD according to the fourth embodiment of the present invention. In the pixel area 26 of the fourth embodiment, the electrode array structure is an integration of the first embodiment, the second embodiment and the third embodiment. As shown in FIG. 7A, when the pattern of the tooth 28b, 28c, 28d of the common electrode 28 is formed to present an inverted Christmas tree-like profile, the pattern of the tooth 30b, 30c of the pixel electrode 30 is formed to present a Christmas tree-like profile. Alternatively, as shown in FIG. 7B, when the pattern of the tooth 28b, 28c, 28d of the common electrode 28 is formed to present a Christmas tree-like profile, the pattern of the tooth 30b, 30c of the pixel electrode 30 is formed to present an inverted Christmas tree-like profile. This achieves the aims of eliminating the coloring phenomenon and increasing the aperture ratio.

Also, the profile of the tooth 28b, 28c, 28d of the common electrode 28 and the tooth 30b, 30c of the pixel electrode 30 can be modified, in which a rectangular strip is disposed between two adjacent trapezoids. Moreover, according to the four modified designs shown in FIGS. 4A to 4D, the tooth 28b, 28c, 28d of the common electrode 28 and the tooth 30b, 30c of the pixel electrode 30 can be formed by appropriately arranging the first electrode layer and the second electrode layer.

It is to be understood that the present invention is not limited to the embodiments described above, but encompasses any and all embodiments within the scope of the following claims.

What is claimed is:

1. An electrode array structure in a pixel area of an in-plane switching mode LCD (IPS-LCD), comprising:
   a comb-shaped common electrode having a bar extending transversely and a plurality of rectangular teeth extending in a first lengthwise direction from the bar; and
   a comb-shaped pixel electrode having a bar extending transversely and a plurality of teeth extending in a second lengthwise direction from the bar, wherein each tooth has a continuous ∠-shaped sidewall and parallel is disposed between adjacent teeth of the common electrode;
   wherein each tooth of the pixel electrode is formed by lengthwise linking of a plurality of trapezoids.

2. The electrode array structure according to claim 1, wherein the short-based length $D_1$ and the long-based length $D_2$ of the trapezoid satisfy the formula $D_2 \leq |D_1 \pm 50 \ \mu m|$, excluding the case that $D_2 = D_1$.

3. The electrode array structure according to claim 1, wherein two adjacent trapezoids are connected by a rectangular strip.

4. The electrode array structure according to claim 1, wherein each tooth of the pixel electrode is formed by lengthwise linking of a plurality of inverted trapezoids.

5. The electrode array structure according to claim 4, wherein the short-based length $D_1$ and the long-based length $D_2$ of the inverted trapezoid satisfy the formula $D_2 \leq |D_1 \pm 50 \ \mu m|$, excluding the case that $D_2 = D_1$.

6. The electrode array structure according to claim 4, wherein two adjacent inverted trapezoids are connected by a rectangular strip.

7. The electrode array structure according to claim 1, wherein each tooth of the pixel electrode is indium tin oxide (ITO).

8. The electrode array structure according to claim 1, wherein each tooth of the pixel electrode comprises:
   a first electrode layer having a rectangular profile;
   a second electrode layer disposed over the first electrode layer and having a continuous ∠-shaped sidewall; and
   a protection layer sandwiched between the first electrode layer and the second electrode layer.

9. The electrode array structure according to claim 8, wherein the second electrode layer is indium tin oxide (ITO).

10. The electrode array structure according to claim 1, wherein each tooth of the pixel electrode comprises:
    a first electrode layer having a continuous ∠-shaped sidewall;
    a second electrode layer disposed over the first electrode layer and having a rectangular profile; and
    a protection layer sandwiched between the first electrode layer and the second electrode layer.

11. The electrode array structure according to claim 10, wherein the second electrode layer is indium tin oxide (ITO).

12. An electrode array structure in a pixel area of an in-plane switching mode LCD (IPS-LCD), comprising:
    a comb-shaped common electrode having a bar extending transversely and a plurality of teeth extending in a first lengthwise direction from the bar, wherein each tooth of the common electrode has a continuous ∠-shaped sidewall; and
    a comb-shaped pixel electrode having a bar extending transversely and a plurality of rectangular-shaped teeth extending in a second lengthwise direction from the bar, wherein each tooth of the pixel electrode parallel is disposed between adjacent teeth of the common electrode;
    wherein each tooth of the common electrode is formed by lengthwise linking of a plurality of trapezoids.

13. The electrode array structure according to claim 12, wherein the short-based length $D_1$ and the long-based length $D_2$ of the trapezoid satisfy the formula $D_2 \leq |D_1 \pm 50 \ \mu m|$, excluding the case that $D_2 = D_1$.

14. The electrode array structure according to claim 12, wherein two adjacent trapezoids are connected by a rectangular strip.

15. The electrode array structure according to claim 12, wherein each tooth of the common electrode is formed by lengthwise linking of a plurality of inverted trapezoids.

16. The electrode array structure according to claim 15, wherein the short-based length $D_1$ and the long-based length $D_2$ of the inverted trapezoid satisfy the formula $D_2 \leq |D_1 \pm 50 \ \mu m|$, excluding the case that $D_2 - D_1$.

17. The electrode array structure according to claim 15, wherein two adjacent inverted trapezoids are connected by a rectangular strip.

18. The electrode array structure according to claim 12, wherein each tooth of the common electrode is indium tin oxide (ITO).

19. The electrode array structure according to claim 12, wherein each tooth of the common electrode comprises:
    a first electrode layer having a rectangular profile;
    a second electrode layer disposed over the first electrode layer and having a continuous ∠-shaped sidewall; and
    a protection layer sandwiched between the first electrode layer and the second electrode layer.

20. The electrode array structure according to claim 19, wherein the second electrode layer is indium tin oxide (ITO).

21. The electrode array structure according to claim 12, wherein each tooth of the common electrode comprises:
    a first electrode layer having continuous ∠-shaped sidewall;
    a second electrode layer disposed over the first electrode layer and having a rectangular profile; and
    a protection layer sandwiched between the first electrode layer and the second electrode layer.

22. The electrode array structure according to claim 21, wherein the second electrode layer is indium tin oxide (ITO).

23. An electrode array structure in a pixel area of an in-plane switching mode LCD (IPS-LCD), comprising:
    a comb-shaped common electrode having a bar extending transversely and a plurality of teeth extending in a first lengthwise direction from the bar, wherein each tooth of the common electrode has a continuous ∠-shaped sidewall; and
    a comb-shaped pixel electrode having a bar extending transversely and a plurality of teeth extending in a second lengthwise direction from the bar, wherein each tooth has a continuous ∠-shaped sidewall and parallel is disposed between adjacent teeth of the common electrode;
    wherein each tooth of the common electrode is formed by lengthwise linking of a plurality of trapezoids, and each tooth of the pixel electrode is formed by lengthwise linking of a plurality of inverted trapezoids.

24. The electrode array structure according to claim 23, wherein the short-based length $D_1$ and the long-based length $D_2$ of the trapezoid satisfy the formula $D_2 \leq |D_1 \pm 50 \mu m|$, excluding the case that $D_2 = D_1$.

25. The electrode array structure according to claim 23, wherein two adjacent trapezoids are connected by a rectangular strip, and two adjacent inverted trapezoids are connected by a rectangular strip.

26. The electrode array structure according to claim 23, wherein each tooth of the common electrode is formed by lengthwise linking of a plurality of inverted trapezoids, and each tooth of the pixel electrode is formed by lengthwise linking of a plurality of trapezoids.

27. The electrode array structure according to claim 26, wherein the short-based length $D_1$ and the long-based length $D_2$ of the trapezoid satisfy the formula $D_2 \leq |D_1 \pm 50 \mu m|$, excluding the case that $D_2 = D_1$.

28. The electrode array structure according to claim 26, wherein two adjacent trapezoids are connected by a rectangular strip, and two adjacent inverted trapezoids are connected by a rectangular strip.

29. The electrode array structure according to claim 23, wherein each tooth of the common electrode is indium tin oxide (ITO).

30. The electrode array structure according to claim 23, wherein each tooth of the pixel electrode is indium tin oxide (ITO).

* * * * *